United States Patent
Dando

(10) Patent No.: US 7,931,737 B2
(45) Date of Patent: Apr. 26, 2011

(54) SYSTEMS AND METHODS FOR RESTRICTING SCALE IN GAS SCRUBBERS AND RELATED COMPONENTS

(75) Inventor: Neal Richard Dando, Murrysville, PA (US)

(73) Assignee: Alcoa Inc., Pittsburgh, PA (US)

( * ) Notice: Subject to any disclaimer, the term of this patent is extended or adjusted under 35 U.S.C. 154(b) by 247 days.

(21) Appl. No.: 12/397,248

(22) Filed: Mar. 3, 2009

(65) Prior Publication Data

US 2009/0223367 A1 Sep. 10, 2009

Related U.S. Application Data

(60) Provisional application No. 61/034,857, filed on Mar. 7, 2008.

(51) Int. Cl.
*B01D 53/14* (2006.01)
*C25C 3/22* (2006.01)

(52) U.S. Cl. .......... 95/131; 96/150; 138/145; 423/240 S

(58) Field of Classification Search .............. 95/90, 131, 95/148; 96/108, 123, 143, 150; 138/145, 138/146; 204/242, 247; 423/240 R, 240 S
See application file for complete search history.

(56) References Cited

U.S. PATENT DOCUMENTS

| | | |
|---|---|---|
| 3,412,015 A | 11/1968 | Schulze zur Wiesche et al. .............. 208/308 |
| 3,415,039 A | 12/1968 | Rushton et al. ................. 95/233 |
| 4,101,393 A | 7/1978 | Hargis ............................ 204/67 |
| 4,828,435 A | 5/1989 | Gilbert et al. .................... 406/92 |
| 5,705,140 A * | 1/1998 | Johansing, Jr. ................ 423/490 |
| 6,960,234 B2 * | 11/2005 | Hassett .............................. 48/77 |
| 2004/0112757 A1 | 6/2004 | Siljan et al. .................... 205/372 |
| 2005/0031894 A1 * | 2/2005 | Klos et al. ...................... 428/659 |
| 2006/0289290 A1 | 12/2006 | Girault et al. ............... 204/157.3 |

FOREIGN PATENT DOCUMENTS

| | | |
|---|---|---|
| GB | 1 038 173 | 8/1966 |
| GB | 1 330 713 | 9/1973 |

OTHER PUBLICATIONS

Dando, N. R., et al., "Hard Gray Build-Up," *The Minerals, Metals & Materials Society*, 137th Annual Meeting & Exhibition, Mar. 9-13, 2008, pp. 1-5, New Orleans, Louisiana, U.S.A.
Wei, M. W., *Air Pollution Engineering Manual*, Chapter 14, Metallurgical Industry, "Primary Aluminum Industry," Buonicore, and W. Davies, eds., Van Nostrand Reinhold, New York, NY, 1992, pp. 590-605.
International Search Report and Written Opinion for corresponding PCT Application No. PCT/US2009/035896, dated Jun. 10, 2009.

* cited by examiner

*Primary Examiner* — Frank M Lawrence
(74) *Attorney, Agent, or Firm* — Greenberg Traurig, LLP

(57) ABSTRACT

Systems, methods and apparatus for restricting scale build-up in gas scrubbers and piping are disclosed. The scrubbers and/or pipes may have a coating disposed on internal surfaces thereof. The coating restricts formation of scale within the pipe, especially scale that would normally accumulate due to fluoride-enriched absorbents, such as fluoride-enriched alumina.

17 Claims, 4 Drawing Sheets

SYSTEMS AND METHODS FOR RESTRICTING SCALE IN GAS SCRUBBERS AND RELATED COMPONENTS

CROSS-REFERENCE TO RELATED APPLICATION

This application claims priority to U.S. Provisional Patent Application No. 61/034,857, filed Mar. 7, 2008, entitled "SYSTEMS AND METHODS FOR RESTRICTING SCALE IN GAS SCRUBBERS", which is incorporated herein by reference in its entirety.

FIELD OF THE DISCLOSURE

The instant disclosure relates to systems and methods for restricting and/or preventing scale build-up in scrubbers, piping and associated components/apparatus.

BACKGROUND

Alumina-based dry gas scrubbers are employed for capturing fluoride from the gases evolved from the aluminum smelting process (e.g., from electrolytic cells). The dry scrubbing and secondary (reacted) alumina handling systems may be hampered by accumulations of scale, such as hard gray build-up (HGB). If not systematically addressed with cleaning and maintenance procedures, this scale may, for example, reduce the removal efficiency of gaseous fluoride in the dry scrubbers, reduce the capability to convey alumina at suitable rates, reduce filter life, alter the concentration of fluoride on secondary alumina and reduce the feed rate of alumina to smelting pots.

SUMMARY OF THE DISCLOSURE

In one aspect, a system configured to restrict scale build-up in a gas scrubber and associated piping/components is provided. In one approach, the system includes a gas scrubber configured to receive and discharge at least one transported product. The transported product may be reactive materials or inert materials, but generally includes at least some reactive material. In one embodiment, the gas scrubber is configured to receive an absorbent material and a polluted gas (e.g., fluoride-containing gas), and to discharge a pollutant-enriched absorbent (e.g., a fluoride-enriched absorbent) and a treated gas.

At least one pipe is connected to the gas scrubber, and the at least one pipe has an internal surface with a coating disposed thereon. This coating restricts formation of scale within the pipe due to (caused by) the transported products flowing into or out of the gas scrubber. In one embodiment, the coating restricts formation of scale due to at least one of a pollutant-enriched absorbent and a polluted gas. In one embodiment, scale accumulates within a pipe to a thickness of less than 0.1 mm per one month of continuous operation of a gas scrubber in the presence of the coating, where such scale would otherwise accumulate at a larger rate in the absence of the coating and due to the interaction of pollutant-enriched absorbents with piping. In one embodiment, scale accumulates within a pipe to a thickness of less than 0.05 mm per one month of continuous operation of a gas scrubber in the presence of the coating. In one embodiment, no scale accumulation is realized within a pipe due to the coating for a period of at least about six months, or even at least about twelve months of continuous operation of the gas scrubber. In other words, in this embodiment, the coating substantially eliminates the formation of any appreciable amount of scale within the pipe for a period of at least about six months, or even at least about twelve months of continuous operation of the gas scrubber. As used herein, "continuous operation" means that the gas scrubber is operated on a nearly continuous basis over a specified duration, except for periods of any regularly scheduled maintenance.

In one embodiment, the coating is a non-oxide-containing ceramic. In one embodiment, the coating is a non-metal-containing ceramic. In one embodiment, the coating is polymer based. In one embodiment, the coating is carbon based. In one embodiment, the coating is a diamond-like carbon coating (e.g., a carbon material containing at least some amount of sp3 hybridized carbon atoms). In one embodiment, the coating is capable of eliminating formation of scale within the pipe for a period of at least about six months. In one embodiment, the coating is capable of eliminating formation of scale within the pipe for a period of at least about 12 months. In one embodiment, the coating is capable of eliminating formation of scale within the pipe for a period of at least about 18 months. In one embodiment, the coating is capable of eliminating formation of scale within the pipe for a period of at least about 24 months. In one embodiment, the coating has a thickness of at least about 5 microns. In one embodiment, the coating has a thickness of at least about 7 microns. In one embodiment, the coating has a thickness of at least about 10 microns. In one embodiment, the coating has a thickness of at least about 12 microns. In one embodiment, the coating has a thickness of at least about 15 microns. In one embodiment, the coating restricts direct contact between a metal surface of the pipe (e.g., a metal oxide surface) and the transported product(s). In one embodiment, the coating restricts adhesion or formation of bonds between a metal surface of the pipe and the transported product(s). In one embodiment, the coating is resistant to wear due to interaction with the transported product(s). In one embodiment, the coating has a sufficiently small surface roughness such that pressure drop through the piping is not significantly affected.

In one approach, the transported product is an absorbent material, such as alumina, and/or a fluoride-enriched absorbent, such as fluoride-enriched alumina (e.g., fluoride-enriched activated alumina), and the coating restricts the surface adhesion or formation of bonds between a metal surface of the pipe and one or more of these transported products. In one embodiment, the transported product is an off gases from an aluminum electrolysis cell, and the coating restricts the surface adhesion or formation of bonds between a metal surface of the pipe and the off gases. Other transported products may be used in conjunction with the gas scrubber.

In another aspect, methods of operating gas scrubbers in the absence of scale are provided. In one approach, a method includes the steps of passing a fluoride-containing gas or other transported product(s) through a gas scrubber, contacting the fluoride-containing gas with an absorbent material, thereby creating a fluoride-enriched absorbent, discharging the fluoride-enriched absorbent from the gas scrubber via coated piping, and supplying the fluoride-enriched absorbent to an aluminum electrolysis cell via the coated piping, where the coated piping is substantially free of scale after six months of continuous operation and in the absence of any pipe cleaning activities. In one embodiment, the contacting step occurs in a mixing zone of the gas scrubber, wherein at least some of the mixing zone comprises a coating, and coated portions of the mixing zone are substantially free of scale after six months of continuous operation due to the coating and in the absence of any mixing zone cleaning activities. In one embodiment, a method includes flowing off gases from the aluminum electrolysis cell to the gas scrubber via a return pipe, where an internal surface of the return pipe is coated with a coating, and where the return pipe is substantially free of scale after 6 months of continuous operation and in the absence of any pipe cleaning activities.

These and other aspects, advantages, and novel features of the invention are set forth in part in the description that follows and will become apparent to those skilled in the art upon examination of the following description and figures, or may be learned by practicing the invention.

DETAILED DESCRIPTION

Reference will now be made in detail to the accompanying drawings, which at least assist in illustrating various pertinent embodiments of the present invention.

Figure 1:
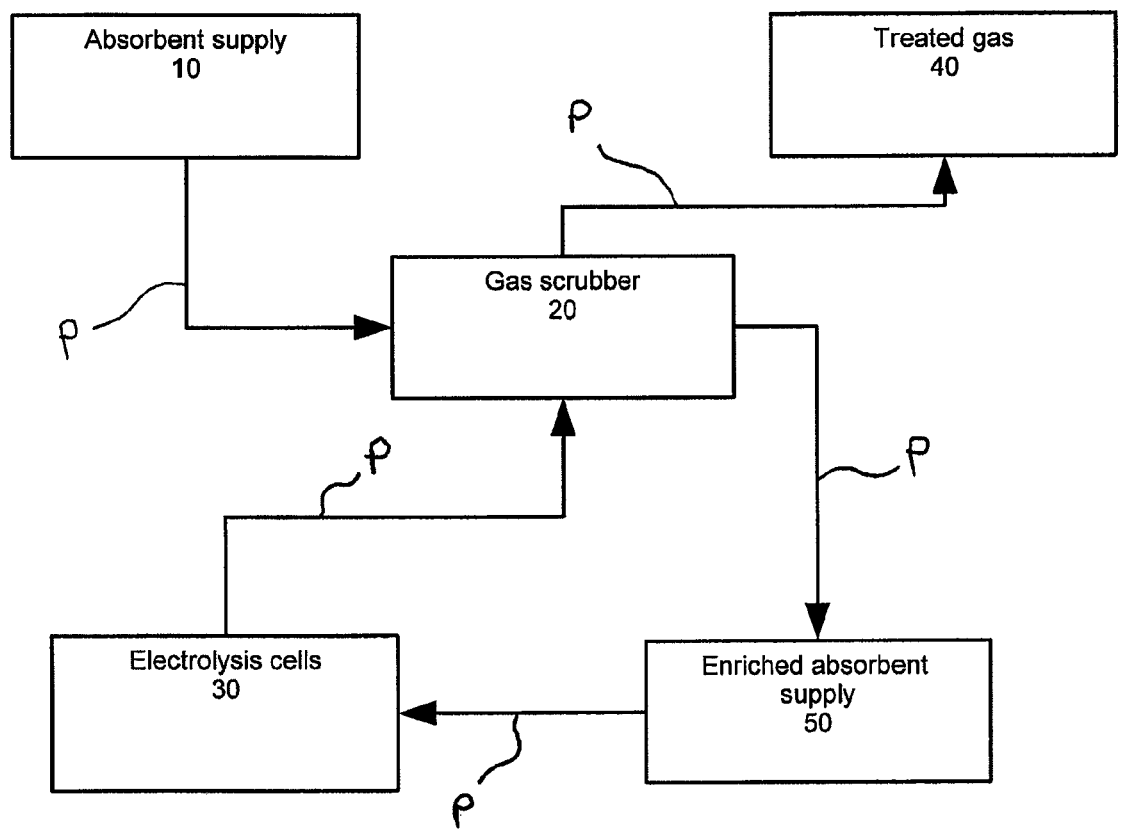
FIG. 1 is a schematic view of one embodiment of a gas-scrubber/aluminum electrolysis cell arrangement.

FIG. 1 illustrates one embodiment of a gas-scrubber/aluminum electrolysis cell arrangement. The gas scrubber 20 is connected to an absorbent supply 10 and a plurality of aluminum electrolysis cells 30 via piping P. The scrubber 20 includes a treated gas outlet 40 for discharging treated gas. The scrubber 20 is also connected to an enriched absorbent supply 50 via piping P. The enriched absorbent supply 50 supplies enriched absorbent to the electrolysis cells 30 via piping P. Polluted off gases may flow from the electrolysis cells 30 to the gas scrubber 20 via piping P.

As used herein, "gas scrubber" means any apparatus configured to receive at least one transported product, and treat at least a portion of the transported product(s). In one embodiment, the gas scrubber is configured to receive a polluted gas stream, such as a fluoride-containing gas, and discharge a treated gas stream. The gas scrubber may be configured to receive an absorbent material for treating the polluted gas stream. The gas scrubber may be configured to discharge a pollutant-enriched absorbent. As used herein, "polluted gas stream" means any industrial gas stream comprising any appreciable amount of unwanted constituents, such as the off gases from an aluminum electrolysis cell. As used herein, "fluoride-containing gas" means any industrial gas stream comprising any appreciable amount of fluoride, either in elemental or compound form. A fluoride-containing gas is a species of the polluted gas stream genus. As used herein, "treated gas" means a gas stream that exits the gas scrubber containing less unwanted constituents than a corresponding polluted gas stream entering the gas scrubber.

In operation, polluted gas (e.g., a fluoride-containing gas) from one or more electrolysis cells 30 is provided to the scrubber 20 via piping P. Concomitantly, an absorbent material from the absorbent supply 10 is provided to the scrubber 20 via piping P. The absorbent material and polluted gases may contact each other in a mixing zone of the scrubber 20, where the absorbent material may remove (e.g., absorbs, adsorbs) unwanted constituents from the polluted gas stream. This enriched-absorbent material is discharged to the enriched absorbent supply 50 via piping P for reuse in the electrolysis cells 30. For example, in aluminum electrolysis cells, alumina may be used as the absorbent, and fluoride-enriched alumina may be discharged to enriched absorbent supply for reuse as feed materials for the aluminum electrolysis cells. Other absorbents and configurations may be used with respect to other electrolysis cells and/or gas scrubbers.

As used herein, "absorbent material" means any material adapted for use in the gas scrubber and intended to contact the polluted gas stream to remove unwanted constituents. The absorbent material may remove unwanted constituents via absorption or adsorption. In one embodiment, the absorbent material comprises alumina, such as gibbsite, boehmite, gamma, delta, kappa, theta and alpha phases of alumina or mixtures thereof. With respect to aluminum electrolysis cells, alumina is a useful adsorbent since the enriched alumina can be fed to the smelting pot (to make aluminum). In this manner, the evolved fluoride is returned to the smelting process, which may be desired in aluminum electrolysis cells to assist in the production of cryolite ($Na_3AlF_6$). As used herein, "enriched absorbent" means an absorbent material that includes an appreciable amount of at least one unwanted constituent. The enriched absorbent generally obtains unwanted constituents during its contact with the polluted gas stream, such as in, or proximal to, the gas scrubber. As used herein, "fluoride-enriched absorbent" means an absorbent material that includes an appreciable amount of fluoride. The fluoride-enriched absorbent generally obtains fluoride during its contact with a fluoride-containing gas, such as while the adsorbent is in, or proximal to, the gas scrubber. Fluoride-enriched absorbent is a species of the pollutant-enriched absorbent genus. In one embodiment, the fluoride-enriched absorbent comprises fluoride-enriched alumina. Fluoride-enriched alumina generally comprises at least about 0.005 gram of fluoride per gram of alumina, or even at least about 1 gram of fluoride per gram of alumina.

As noted above, piping P is used to convey various materials relating to the gas scrubber 20. With conventional systems, this piping (and sometimes the mixing zone of the gas scrubber) may accumulate scale (e.g., hard gray build-up—HGB). Scaling may occur in piping upstream or downstream of the gas scrubber, but is generally more prevalent downstream of the gas scrubber. Scale is unwanted for many reasons, including, for example, the need to be periodically shut down the scrubber in order to clean/replace the piping and/or components/portions of the scrubber, or even to clean other apparatus associated with the scrubber (e.g., the enriched absorbent supply). The instant disclosure facilitates prevention/restriction of scale build-up by utilizing a coating within the piping and/or other apparatus/components associated with the gas scrubber.

Alumina may "scrub" HF from a polluted gas via the following reaction:

$$Al-OH+HF \rightarrow Al-F+H_2O \qquad (1)$$

In metal piping, such as iron piping for ducting and transfer piping, there are metal oxide and metal hydroxide bonds on the inner (and outer) surfaces of such piping. These metal oxide/metal hydroxide sites are reaction sites for bonding of fluoride-enriched adsorbents. Al—F (and other fluoride-containing compounds) may form metal-fluoride bonds, which is the basis for adhesion of the fluoride-enriched adsorbent to the inner surface of the metal pipes. In fact, the scaling process in alumina dry gas scrubbers may be driven by the physical breakdown or attrition of the alumina particles, which causes a chemical reaction between the newly created alumina (aluminum oxide) surfaces, fluoride, and the metal oxide/hydroxide inner surfaces (e.g., iron oxide) of the scrubber and piping. Scaling is more prevalent at high velocity/high collision locations (bends, high velocity airlifts, localized turbulence zones due to constrictions or leaks) due to the increased breakdown of the alumina particles at these points (due to particle-particle collisions or particle-metal surface collisions).

Generally, a metal-F bond is a strong chemical bond capable of supporting a continued accumulation of scale. Indeed, the growth of scale constricts the flow path of the pipe, thereby increasing linear flow velocity and accelerating collision, which further induces scale formation. By coating the piping surfaces, fluoride-enriched adsorbent transported through the piping is prevented and/or restricted from coming into direct contact with metal oxide/hydroxide surfaces of the pipe or scrubber, thereby preventing/restricting formation of scale. The use of coatings reduces/eliminates exposed metal oxide surfaces, and thereby reduces/eliminates the potential for chemical reaction between the fluoride-enriched alumina and metal oxide surfaces.

As used herein, "pipe" means any apparatus configured to connect with the gas scrubber and which facilitates flow of fluids (e.g., gases and/or liquids) and/or solids to and/or from the gas scrubber. In one embodiment, a pipe is metal-based (e.g., steel) so as to withstand the operating temperatures of the gas scrubber. With respect to this disclosure, "ducts", "conduits", "air slides", "dense phase transport systems", "hyperdense phase transport systems" and the like are included in the definition of pipe and piping.

As used herein, "coating" means any material capable of being applied to most, or all, of the internal surfaces of the pipe, and which is/are substantially inert relative to any of the polluted gas stream, absorbent material, and the pollutant-enriched absorbent. In turn, the coating restricts formation of scale within a pipe due to any of the polluted gas stream, absorbent material and/or the pollutant-enriched absorbent. In one embodiment, the coating substantially covers all or nearly all internal surface of the pipe, such as when the pipe in substantially all metal. In other embodiments, the coating may cover only portions of the internal surfaces of the pipe, such as only those surfaces that are made of metal.

In one embodiment, a coating is substantially inert relative to any of a fluoride-containing gas stream, alumina, and fluoride-enriched alumina. In this embodiment, the coating may restrict formation of metal-fluoride bonds between the fluoride-enriched absorbent and the pipe. In one embodiment, a coating is a carbon-based coating, such as a diamond-like carbon. In one embodiment, a coating is a non-metal oxide containing ceramic, such as a tungsten carbide, a boron carbide, and/or a silicon carbide coating, to name a few. In one embodiment, a coating is a polymeric coating, such as any of an organic coating, an inorganic coating, or mixture thereof (e.g., TEFLON® PTFE (polytetrafluoroethane), PFA (perfluoro-alkoxy) or other polymer). In one embodiment, a coating is a cermet based coating. In one embodiment, a coating is a hybrid polymer-ceramic based coating, such as a ceramic-PTFE or -PFA mixture.

In one embodiment, the coating is resistant to wear due to interaction with the fluoride-enriched absorbent. For example, the coating may be durable for a period of at least about six months, or at least about twelve months, or even at least about 24 months. As used herein "durable" means that the coating is still substantially present (serviceable) on the surfaces of the pipe for the specified time period. In one embodiment, the coating is substantially adherent to the pipe/piping and is substantially wear resistant. Wear resistance may be important for alumina transport pipes or bends and turbulent flow areas of piping as alumina is a hard, abrasive powder. In one embodiment, the coating has a smooth surface (e.g., a low surface roughness) so that pressure drop through the piping is not significantly affected and/or to reduce/prevent turbulence. The coating may be applied directly to the surface of the piping as solids, a solvent, a water-borne emulsion or dispersion, or via a plasma-spray or vapor-deposition methods. The coatings may be self-supporting films on the interior components of piping, interior component of alumina based dry gas scrubbers, or secondary alumina transport systems, among others.

As used herein, "scale" means any material that tends to accumulate within a pipe due to interaction of materials of the pipe with any of the polluted gas stream, the absorbent material, and/or the pollutant-enriched absorbent. In one embodiment, the scale is hard-gray scale, which may accumulate on interior surfaces of a pipe to an average thickness of at least about 0.2 mm per month of continuous operation of a gas scrubber in the absence of the coating within the pipe due to the interaction of the fluoride-enriched absorbents with piping. In one embodiment, scale may accumulate on interior surfaces of a pipe to an average thickness of at least about 0.5 mm per month of continuous operation of a gas scrubber in the absence of the coating within the pipe. In some circumstances, scale may accumulate on interior surfaces of a pipe to an average thickness of about 2 mm per month of continuous operation of a gas scrubber in the absence of the coating within the pipe.

EXAMPLES

Example 1

Coating of Piping

Figure 2:
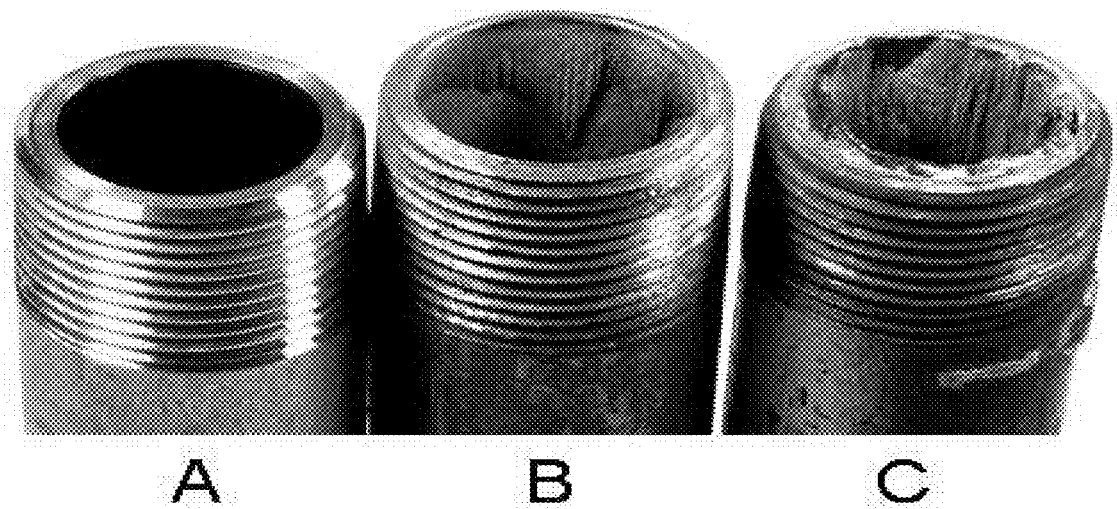
FIG. 2 is a photograph illustrating various scale build-up within pipes with and without coating.

Piping is coated with a diamond-like carbon coating and connected to an alumina gas scrubber system. Other piping is left free of coating. The results of scale build-up are illustrated in FIG. 2. After six months and twelve months of continuous service, the coated piping (A) shows no visible signs of scale accumulation, whereas the uncoated piping realizes scale accumulation and build-up after six months (B) and twelve months (C) of continuous service. Indeed, the uncoated piping having twelve months of continuous service (C) realizes severe scaling whereas the coated piping (A) has no visible scale after twelve months of continuous service.

Example 2

Coating of Sensor

Figure 3:
FIG. 3 is a photograph illustrating a thermowell with a coating and having no scale build-up after 10 months of operation.
Figure 4:
FIG. 4 is a photograph illustrating a thermowell without coating and having significant scale build-up after 10 months of operation.

Two steel thermowells are inserted into an off-duct of an operating aluminum electrolysis cell. The first thermowell is coated with a fluoro-polymer coating having a thickness of from about 3 mils to about 5 mils. The second thermowell is absent of the fluoro-polymer coating. The thermowells remain in the off-duct for about 10 months, and then removed. The first thermowell has no scale build-up, as illustrated in FIG. 3, only having a small amount of non-scale powder on the surface. The second thermowell has significant scale build-up (2-3 millimeters), as illustrated in FIG. 4.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A system comprising:
a gas scrubber configured to receive an absorbent material and a fluoride-containing gas and to discharge a fluoride-enriched absorbent and a treated gas;
a pipe connected to the gas scrubber, wherein the pipe is configured to receive the fluoride-enriched absorbent, the pipe having an internal surface that has a coating disposed thereon, wherein the coating restricts formation of scale within the pipe due to the fluoride-enriched absorbent.

2. The system of claim 1, wherein the coating is a non-oxide or non-metal-oxide containing ceramic.

3. The system of claim 1, wherein the coating is polymer based.

4. The system of claim 1, wherein the coating is carbon based.

5. The system of claim 4, wherein the coating is a diamond-like carbon coating.

6. The system of claim 1, wherein the coating eliminates formation of scale within the pipe for a period of at least about six months.

7. The system of claim 1, wherein the coating has a thickness of at least about 5 microns.

8. The system of claim 1, wherein the coating restricts any direct contact between a metal oxide surface of the metal pipe and the fluoride-enriched absorbent.

9. The system of claim 1, wherein pipe comprises metal, and wherein the coating restricts formation of bonds between metal surfaces of the pipe and the fluoride-enriched absorbent.

10. The system of claim 9, wherein the fluoride-enriched absorbent comprises fluoride-enriched alumina, and wherein the coating restricts the formation of bonds between metal surfaces of the pipe fluoride-enriched alumina.

11. The system of claim 1, wherein the coating is wear resistant.

12. The system of claim 1, wherein the coating has a surface roughness of not greater than about 25 microns.

13. The system of claim 1, wherein the pipe is a first pipe, wherein the system comprises:
a second pipe connected to the gas scrubber, wherein the second pipe is configured to carry off gases to the gas scrubber, wherein the second pipe has an internal surface that has a second coating disposed thereon, wherein the second coating restricts formation of scale within the second pipe due to the off gases.

14. The system of claim 1, further comprising:
an aluminum electrolysis cell adapted to receive the fluoride-enriched absorbent via the pipe.

15. A method comprising:
passing a fluoride-containing gas through a gas scrubber;
contacting the fluoride-containing gas with an absorbent material, thereby creating a fluoride-enriched absorbent;
discharging the fluoride-enriched absorbent from the gas scrubber via coated piping; and
supplying the fluoride-enriched absorbent to an aluminum electrolysis cell via the coated piping, wherein the coated piping is substantially free of scale after 6 months of continuous operation and in the absence of any pipe cleaning activities.

16. The method of claim 15, wherein the contacting occurs in a mixing zone of the gas scrubber, wherein at least some of the mixing zone comprises a coating, and wherein coated portions of the mixing zone are substantially free of scale after 6 months of continuous operation due to the coating and in the absence of any mixing zone cleaning activities.

17. The method of claim 15, comprising:
flowing off gases from the aluminum electrolysis cell to the gas scrubber via a return pipe, wherein an internal surface of the return pipe is coated with a coating, and wherein the return pipe is substantially free of scale after 6 months of continuous operation and in the absence of any pipe cleaning activities.

* * * * *